(12) United States Patent
Huang et al.

(10) Patent No.: US 10,513,008 B2
(45) Date of Patent: Dec. 24, 2019

(54) CHEMICAL MECHANICAL POLISHING SMART RING

(71) Applicant: Applied Materials, Inc., Santa Clara, CA (US)

(72) Inventors: Zubin Huang, Santa Clara, CA (US); Stephen A. Wells, West Sussex (GB); Ramesh Gopalan, Fremont, CA (US); Gangadhar Sheelavant, Karnataka (IN); Simon Yavelberg, Cupertino, CA (US)

(73) Assignee: APPLIED MATERIALS, INC., Santa Clara, CA (US)

( * ) Notice: Subject to any disclaimer, the term of this patent is extended or adjusted under 35 U.S.C. 154(b) by 173 days.

(21) Appl. No.: 15/699,645

(22) Filed: Sep. 8, 2017

(65) Prior Publication Data

US 2018/0071889 A1      Mar. 15, 2018

(30) Foreign Application Priority Data

Sep. 15, 2016   (IN) .............................. 201641031439

(51) Int. Cl.
*B24B 37/32*       (2012.01)
*B24B 37/04*       (2012.01)
(Continued)

(52) U.S. Cl.
CPC ............ *B24B 37/32* (2013.01); *B24B 37/042* (2013.01); *B24B 37/046* (2013.01); *B24B 37/34* (2013.01);
(Continued)

(58) Field of Classification Search
CPC ..... B24B 37/32; B24B 37/042; B24B 37/046; B24B 37/34; G01H 1/00; G01H 11/06
(Continued)

(56) References Cited

U.S. PATENT DOCUMENTS

| 5,851,136 A | 12/1998 | Lee |
| 6,106,661 A | 8/2000 | Raeder et al. |

(Continued)

FOREIGN PATENT DOCUMENTS

| JP | 2001035822 A | * | 2/2001 |
| JP | 2001035822 A | | 2/2001 |

(Continued)

OTHER PUBLICATIONS

Machine Translation of JP 2007015107 A.*

(Continued)

*Primary Examiner* — Dung Van Nguyen
(74) *Attorney, Agent, or Firm* — Patterson + Sheridan LLP

(57) ABSTRACT

Embodiments of the present disclosure generally relate to chemical mechanical polishing (CMP) of substrates. In one embodiment, a carrier head for a CMP apparatus is disclosed herein. The carrier head includes a body, a retaining ring, and a sensor assembly. The retaining ring is coupled to the body. The sensor assembly is positioned at least partially in the body. The sensor assembly includes a transmitter, an antenna, and a vibrational sensor. The transmitter has a first end and a second end. The antenna is coupled to the first end of the transmitter. The vibrational sensor is coupled to the second end. The vibrational sensor is configured to detect vibration during chemical mechanical processes with respect to radial, azimuthal, and angular axes of the carrier head.

18 Claims, 7 Drawing Sheets

(51) Int. Cl.
*B24B 37/34* (2012.01)
*G01H 11/06* (2006.01)
*G08C 17/02* (2006.01)
*H04Q 9/00* (2006.01)
*G01H 1/00* (2006.01)

(52) U.S. Cl.
CPC ............... *G01H 1/00* (2013.01); *G01H 11/06* (2013.01); *G08C 17/02* (2013.01); *H04Q 9/00* (2013.01); *G08C 2201/50* (2013.01); *H04Q 2209/43* (2013.01); *H04Q 2209/47* (2013.01); *H04Q 2209/88* (2013.01)

(58) Field of Classification Search
USPC .............................. 451/6, 8, 288, 398, 41, 5
See application file for complete search history.

(56) References Cited

U.S. PATENT DOCUMENTS

| | | | |
|---|---|---|---|
| 6,368,189 | B1 | 4/2002 | Maloney et al. |
| 6,390,908 | B1 | 5/2002 | Chen et al. |
| 7,008,310 | B2 | 3/2006 | Andres |
| 2004/0077167 | A1 | 4/2004 | Willis et al. |
| 2007/0235133 | A1* | 10/2007 | Benassi ............... B24B 37/0056 156/345.12 |
| 2014/0027407 | A1* | 1/2014 | Deshpande ........... B24B 37/005 216/53 |

FOREIGN PATENT DOCUMENTS

| | | | |
|---|---|---|---|
| JP | 2007015107 | A * | 1/2007 |
| JP | 2007015107 | A | 1/2007 |
| JP | 2010064220 | A | 3/2010 |
| WO | 2015195284 | A1 | 12/2015 |

OTHER PUBLICATIONS

Machine Translation of JP 2001035822.*
International Search Report and Written Opinion for PCT/US2017/050822 dated Dec. 22, 2017.

* cited by examiner

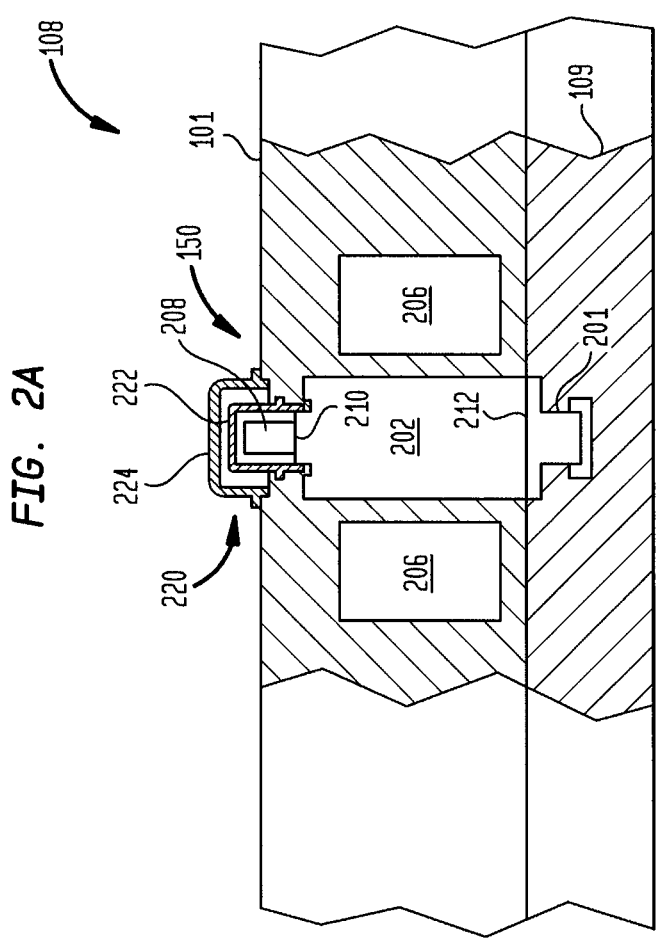

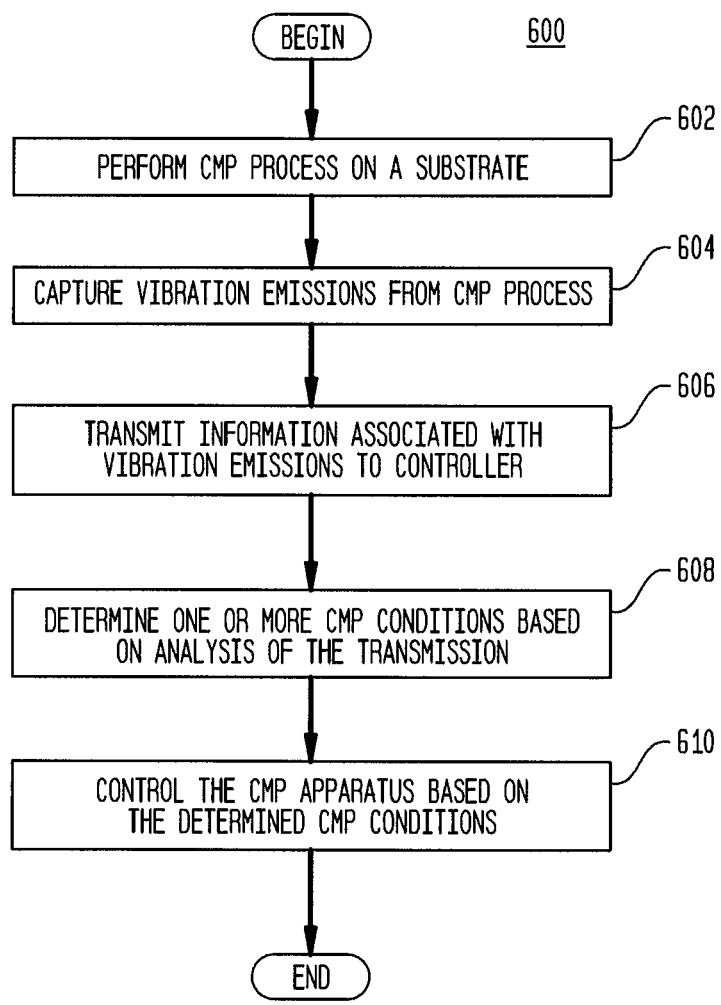

CHEMICAL MECHANICAL POLISHING SMART RING

CROSS-REFERENCE TO RELATED APPLICATIONS

This application claims priority from India Provisional Application No. 201641031439, filed Sep. 15, 2016, which is hereby incorporated by reference in its entirety.

BACKGROUND

Field

Embodiments of the present disclosure generally relate to chemical mechanical polishing (CMP) of substrates, and more specifically to a carrier head having one or more sensor assemblies formed therein.

Description of the Related Art

Integrated circuits are typically formed on substrates by the sequential deposition of conductive, semiconductive or insulative layers. After each layer is deposited, the layer is etched to create circuitry features. As a series of layers are sequentially deposited and etched, the outer or uppermost surface of the substrate, i.e., the exposed surface of the substrate, becomes increasingly non-planar. This non-planar surface presents problems in the photolithographic steps of the integrated circuit fabrication process. Thus, there is a need to periodically planarize the substrate surface.

Chemical mechanical polishing (CMP) is one accepted method of planarization. During planarization, the substrate is typically mounted on a carrier or polishing head. The exposed surface of the substrate is placed against a rotating polishing pad. The polishing pad may be either a "standard" or a fixed-abrasive pad. A standard polishing pad has durable roughened surface, whereas a fixed-abrasive pad has abrasive particles held in a containment media. The carrier head provides a controllable load, i.e., pressure, on the substrate to push the substrate against the polishing pad. A polishing slurry, including at least one chemically-reactive agent, and abrasive particles, if a standard pad is used, is supplied to the surface of the polishing pad.

The effectiveness of a CMP process may be measured by the CMP process's polishing rate, and by the resulting finish (absence of small-scale roughness) and flatness (absence of large-scale topography) of the substrate surface. The polishing rate, finish and flatness are determined by the pad and slurry combination, the relative speed between the substrate and pad, and the force pressing the substrate against the pad.

The CMP retaining ring functions to retain the substrate during polish. The CMP retaining ring also allows slurry transport under the substrate and affects edge performance for uniformity. However, conventional CMP retaining rings do not have integrated sensors that can be used for closed loop control during process, diagnostics or providing feedback on the endpoint of chemical-mechanical polishing processes and catastrophic events, such as for example, substrate breakage or slip out.

Therefore, there is a need for an improved carrier head having a one or more integrated sensor assemblies formed therein.

SUMMARY

Embodiments of the present disclosure generally relate to chemical mechanical polishing (CMP) of substrates. In one embodiment, a carrier head for a CMP apparatus is disclosed herein. The carrier head includes a body, a retaining ring, and a sensor assembly. The retaining ring is coupled to the body. The sensor assembly is positioned at least partially in the body. The sensor assembly includes a transmitter, an antenna, and a vibrational sensor. The transmitter has a first end and a second end. The antenna is coupled to the first end of the transmitter. The vibrational sensor is coupled to the second end. The vibrational sensor is configured to detect vibration during chemical mechanical processes with respect to radial, azimuthal, and angular axes of the carrier head.

In another embodiment, a chemical mechanical polishing system is disclosed herein. The chemical mechanical polishing system includes a carrier head and a controller. The carrier head includes a body, a retaining ring, and a sensor assembly. The retaining ring is coupled to the body. The sensor assembly is positioned at least partially in the body. The sensor assembly includes a transmitter, an antenna, and a vibrational sensor. The transmitter has a first end and a second end. The antenna is coupled to the first end of the transmitter. The vibrational sensor is coupled to the second end. The vibrational sensor is configured to detect vibrations during chemical mechanical processes with respect to radial, azimuthal, and angular axes of the carrier head. The controller is in communication with the sensor assembly.

In another embodiment, a method for determining chemical mechanical polishing conditions is disclosed herein. A chemical mechanical polishing process is performed on a substrate disposed in a chemical mechanical polishing apparatus. A sensor assembly disposed at least partially in a carrier head of the chemical mechanical polishing apparatus captures vibration emissions from the chemical mechanical polishing apparatus. Information associated with the vibration emissions is transmitted to a controller in wireless communication with the sensor assembly. A chemical mechanical polishing conditioned is determined based on an analysis of the transmitted information.

BRIEF DESCRIPTION OF THE DRAWINGS

So that the manner in which the above recited features of the present disclosure can be understood in detail, a more particular description of the disclosure, briefly summarized above, may be had by reference to embodiments, some of which are illustrated in the appended drawings. It is to be noted, however, that the appended drawings illustrate only typical embodiments of this disclosure and are therefore not to be considered limiting of its scope, for the disclosure may admit to other equally effective embodiments.

FIG. 2A is a cross sectional view of the carrier head having one or more sensor assemblies, according to one embodiment.

FIG. 6 is a flow diagram illustrating a method of monitoring a substrate during a chemical mechanical polishing process, according to one embodiment.

For clarity, identical reference numerals have been used, where applicable, to designate identical elements that are common between figures. Additionally, elements of one embodiment may be advantageously adapted for utilization in other embodiments described herein.

DETAILED DESCRIPTION

Figure 1:
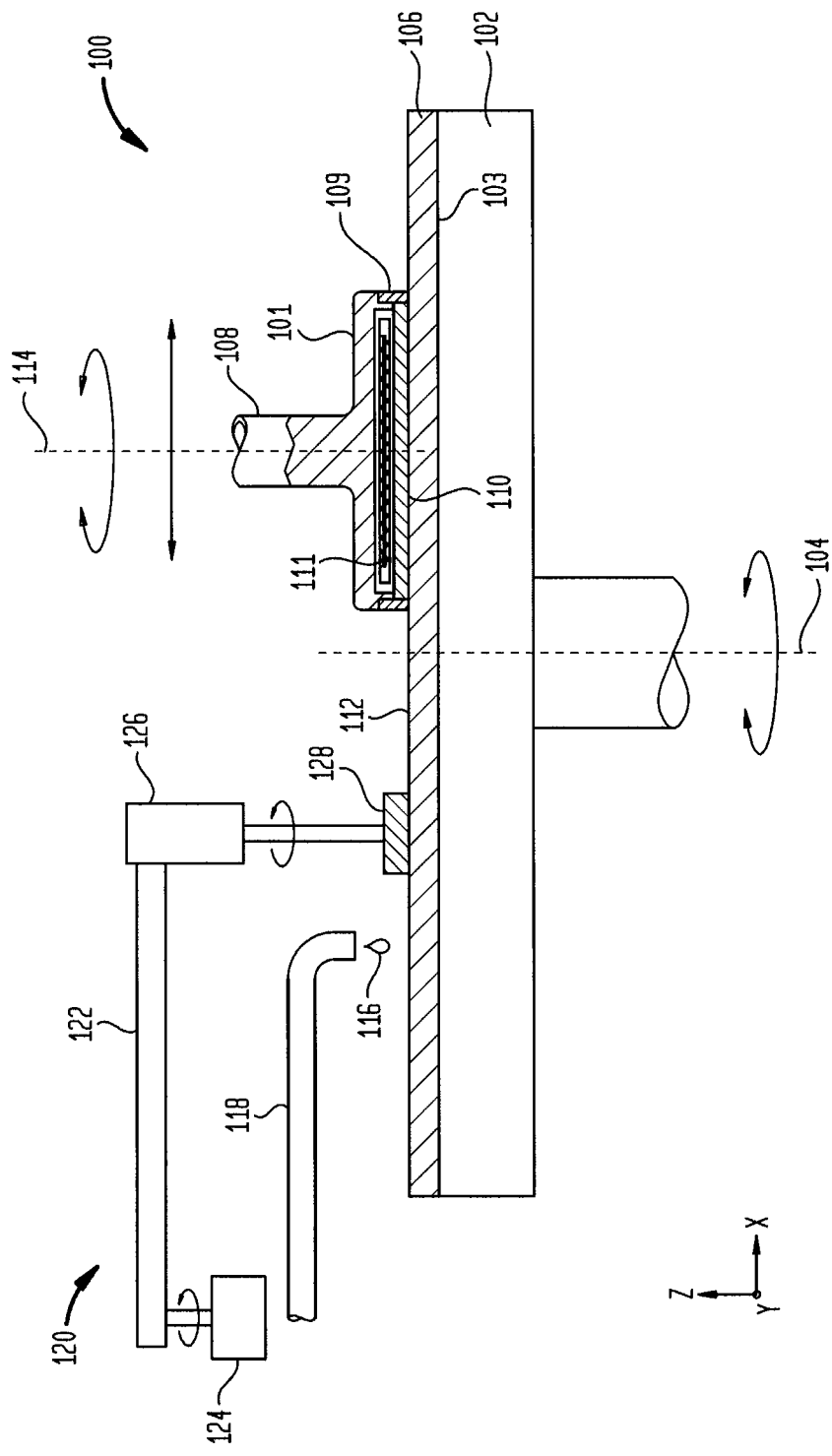
FIG. 1 illustrates a cross-sectional view of a polishing station, according to one embodiment.

FIG. 1, which is shown below, is a schematic sectional view of a polishing station 100 that may be positioned within a larger chemical mechanical polishing (CMP) system that contains multiple polishing stations 100. The polishing station 100 includes a platen 102. The platen 102 may rotate about a central axis 104. A polishing pad 106 may be placed on the platen 102. Typically, the polishing pad 106 covers an upper surface of the platen 102 which is at least one to two times larger than the size of the substrate 110 (e.g., substrate diameter) that is to be processed in the polishing station 100.

The polishing pad 106 includes a polishing surface 112 configured to contact and process one or more substrates 110 and a supporting surface 103 that is positioned over a surface of the platen 102. The platen 102 supports the polishing pad 106 and rotates the polishing pad 106 during polishing. A carrier head 108 holds a substrate 110 against the polishing surface 112 of the polishing pad 106. The carrier head 108 typically includes a flexible diaphragm 111 that is used to urge the substrate 110 against the polishing pad 106, a body 101, and a retaining ring 109 coupled to the body 101 that is used to correct for an inherently non-uniform pressure distribution found across the substrate's surface during the polishing process. The carrier head 108 may rotate about a central axis 114 and/or move in a sweeping motion to generate relative motions between the substrate 110 and the polishing pad 106.

During operation the flexible diaphragm 111 is positioned to urge the substrate 110 against the polishing pad 106, and a carrier head actuator (not shown) that is coupled to a mounting portion (not shown) of the carrier head 108 is configured to separately urge the carrier head 108 and the retaining ring 109 against the surface of the polishing pad 106. The flexible diaphragm 111 is configured to apply a pressure to the backside of the substrate 110 and the carrier head actuator is configured to apply a force to the retaining ring 109.

A delivery arm 118 delivers a polishing fluid 116, such as an abrasive slurry, is supplied to the polishing surface 112 during polishing. The polishing liquid 116 may contain abrasive particles, a pH adjuster and/or chemically active components to enable chemical mechanical polishing of the substrate. The slurry chemistry of 116 is designed to polish wafer surfaces and/or features that may include metals, metal oxides, and semimetal oxides. The polishing station 100 also typically includes a pad conditioning assembly 120 that includes a conditioning arm 122 and actuators 124 and 126 that are configured to cause a pad conditioning disk 128 (e.g., diamond impregnated disk) to be urged against and sweep across the polishing surface 112 at different times during the polishing process cycle to abrade and rejuvenate the surface 112 of the polishing pad 106.

The polishing station 100 may further includes one or more sensor assemblies 150 embedded within the carrier head 108. The one or more sensor assemblies 150 are configured to detect one or more factors affecting substrate processing such as vibration, temperature, humidity and the like. In some configurations, the sensor is configured to wirelessly transfer the detected information to a process controller 190. The carrier head 108 with integrated sensor(s) 150 enable real time analysis of the signals produced by the CMP processes. The detected and transmitted signals received from the sensor(s) 150 can be used for process control, such as for example, endpoint detection, detection of abnormal conditions such as substrate slip, substrate loading and unloading issues, prediction of mechanical performance of the CMP head and other associated mechanical assemblies that are an integral part of CMP polishing, and the like. The recorded signal information may be compared with other detected process conditions to determine if changes have occurred between different process runs. Comparison of the detected sensor data with information stored in the memory of the controller may reveal process endpoints, abnormal conditions, and other diagnostic information.

Thus, embodiments consistent with the present disclosure advantageously provide Fault Detection and Classification (FDC) systems and methods are able to continuously monitors equipment parameters against preconfigured limits using statistical analysis techniques to provide proactive and rapid feedback on equipment health. Such FDC systems and methods advantageously eliminate unscheduled downtime, improve tool availability and reduce scrap.

FIG. 2A is a cross sectional view of the carrier head 108 having one or more sensor assemblies 150 embedded in a channel 160 formed in the carrier head 108, according to one embodiment. Each of the one or more sensor assemblies includes a transmitter 202, a sensor 201, one or more batteries 206, and an antenna 208. The transmitter 202 extends through the carrier head 108. The transmitter 202 has a first end 210 and a second end 212. The first end 210 is coupled to the antenna 208. The antenna 208 may extend partially through the carrier head 108, above the carrier head 108. The antenna 208 is configured to wirelessly communicate information to the system controller 190. The carrier head 108 may further include a cover assembly 220. The assembly 220 is configured to cover the portion of the antenna 208 that extends above the carrier head 108. The cover assembly 220 is configured to protect the antenna 208 and seal off the opening through which the antenna 208 extends. In one embodiment, the cover assembly 220 may include a first cap 222 and a second cap 224. The first cap 222 is positioned over the antenna 208, and extends into the carrier head 108 such that the first cap 222 surrounds at least three sides of the antenna 208. The second cap 224 is positioned about the first cap 222. The second cap 224 ensures that the opening through which the antenna 208 extends is sealed. For example, the second cap 224 at least partially surrounds the antenna 208 and the first cap 222.

The second end 212 of the transmitter 202 is coupled to the sensor 201. The sensor 201 extends at least partially though the carrier head 108 and into the retaining ring 109. The sensor 201 is configured to detect acoustical vibrations during substrate processing. The vibrational emission information produced by CMP processes on the substrate is captured by the sensor 201. The carrier head 108 with the sensor assembly 150 enables real-time analysis of the vibrational signals produced by the CMP processes. The vibrational signals captured by the sensor 201 can be used for process control, such as end point detection, detection of abnormal conditions, such as substrate slippage, substrate loading and unloading issues, prediction of mechanical performance of the CMP head and other associated mechanical assemblies that are an integral part of CMP polishing, and the like. In some embodiments, the captured vibrational information may be resolved into a vibrational signature that is monitored for changes and compared against a library of vibration signatures. Characteristic changes in a vibration frequency spectrum may reveal process endpoints, abnormal conditions, and other diagnostic information. The captured vibration information may be analyzed to reveal mechanical malfunctions such as, for example, substrate scratch detection caused by the polishing process, slurry arm and head collisions, head wear out (e.g., seals, gimbal, etc.), faulty bearings, conditioner head actuations, and the like.

The sensor assembly 150 may transmit to the controller 190 one or more acceleration readings during CMP processing over time for various frequencies. For example, the sensor assembly 150 may transmit the one or more acceleration readings during CMP processing to the controller 190 using short range wireless methods, such as BLUETOOTH, Radio-frequency identification (RFID) signaling and standards, Near field communication (NFC) signaling and standards, Institute of Electrical and Electronics Engineers' (IEEE) 802.11x or 802.16x signaling and standards, or other wireless communication method via transmitter 202. The controller 190 plots the acceleration readings in a graph of time versus frequency. As the gradient of the detected acceleration data shown on the graph changes along a specific frequency, the controller 190 may indicate to the user that an event has occurred. For example, the change in the peak-to-peak variation of the acceleration data at a specific frequency (e.g., 230 Hz) or frequencies (e.g., frequencies between 200-250 Hz) may be associated with breakage and a change in friction due to the film breakage. As such, the continual plotting of acceleration over a range of frequencies over time may provide the user with a reliable end point detection technique without the need for optical sensors or detect the wear out of one or more mechanical components in the system.

In some embodiments, the sensor 201 may be an accelerometer, such as a micro electro-mechanical systems (MEMS) accelerometer, for detecting vibrations. In another embodiment, the sensor 201 may be a three-axis accelerometer. The three-axis accelerometer is configured to measure vibration during CMP processes along the three-axes of the carrier head, i.e., the radial, angular and azimuthal axes. Measuring vibrations with respect to the carrier head 108 provides more vibrational information during CMP processes. This is because during CMP processing, the substrate does not remain in a single position within the retaining ring 109; rather, the substrate precesses within the retaining ring 109. In embodiments where the carrier head 108 contains two sensors 201 in which both sensors are accelerometers, one sensor (i.e., baseline sensor) may be configured to solely detect the baseline acceleration data (e.g., environmental or non-process related accelerations) during CMP processing, while the second sensor (i.e., process sensor) detects process related acceleration data during CMP processing. The system controller 190 may then subtract the detected baseline acceleration data from the process related acceleration data so that the CMP process related information detected by the process sensor can be separated from other external sources of vibration or noise.

Figure 2B:
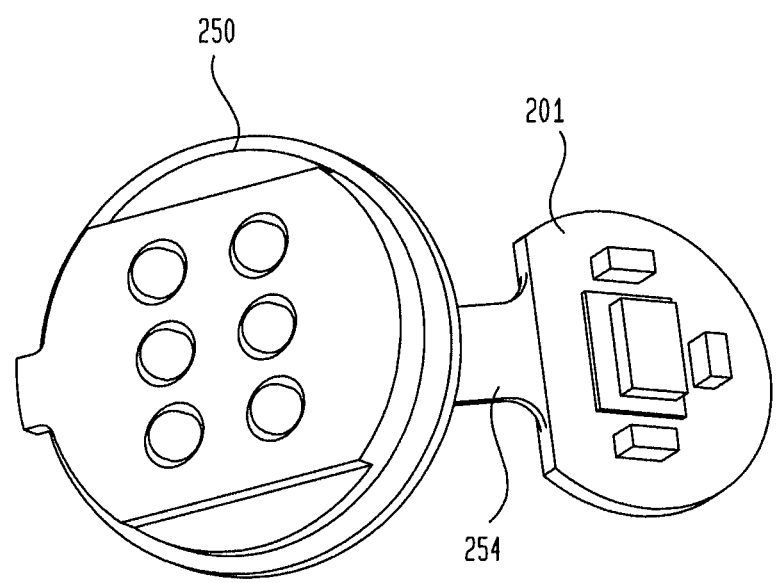
FIG. 2B the sensor of the sensor assembly in FIG. 2A, according to one embodiment.

FIG. 2B illustrates the sensor 201 in further detail. The sensor 201 is coupled to a sensor cover 250 via a ribbon connection 254. The sensor cover 250 is mounted in the retaining ring 109. The ribbon connection 254 the sensor 201 to be physically decoupled from the retaining ring 109 but remain electrically coupled. Decoupling the sensor 201 from the sensor cover 250 can also be used to mechanically isolate the sensor 201 from various external sources of vibration.

Referring back to FIG. 2A, the transmitter 202 is configured to send vibration related signals received from the sensor(s) 201 to the controller 190 via the antenna 208. Thus, in some embodiments, the CMP vibration signals detected by the sensor 201 will be transmitted out of the CMP head 108 using short range wireless methods, such as Bluetooth, radio-frequency identification (RFID) signaling and standards, near field communication (NFC), ZigBee, or other wireless communication methods.

The one or more batteries 206 are configured to provide electrical power for the sensor assembly 150. In the embodiment shown in FIG. 2A, two batteries 206 are illustrated with each battery 206 on a respective side of the transmitter 202. In other embodiments, more or less batteries may be used. The batteries 206 may be replaced when servicing the carrier head 108. In one embodiment, the batteries 206 have a lifetime roughly equal to the lifetime of the carrier head 108, retaining ring 109 or polishing pad 106. Thus, in these embodiments, when the batteries 206 are approaching or are near complete discharge, the carrier head 108, retaining ring 109 or polishing pad 106 are approaching, or is near to, their service life and thus can be changed out during a preventive maintenance activity. In another embodiment, the batteries 206 may be rechargeable.

In another embodiment, the sensor assembly 150 may include power saving functionality. For example, the controller 190 may communicate with the sensor 201 to determine whether the carrier head 108 is still in motion. If the carrier head 108 is still in motion, the batteries 206 will continue to provide power for the sensor assembly 150. If the carrier head 108 however is no longer in motion, the controller 190 may communicate with the transmitter 202 to power down to conserve power. Moreover, the controller 190 may also communicate with the sensor 201 to determine whether the carrier head 108 begun moving. The controller 190 communicates with the transmitter 202 to determine if the sensor 201 has obtained any data. The data would include vibrations that are indicative of carrier head 108 movement. If the controller 190 determines that the carrier head 108 is in motion, the controller 190 will communicate with the transmitter 202 to power on. If the controller 190 determines that the carrier head 108 is not in motion, the controller 190 will not instruct the transmitter 202 to power on. Such functionality extends the life of the sensor assembly 150 by powering on when the carrier head is in motion, and down when the carrier head remains still.

Figure 3:
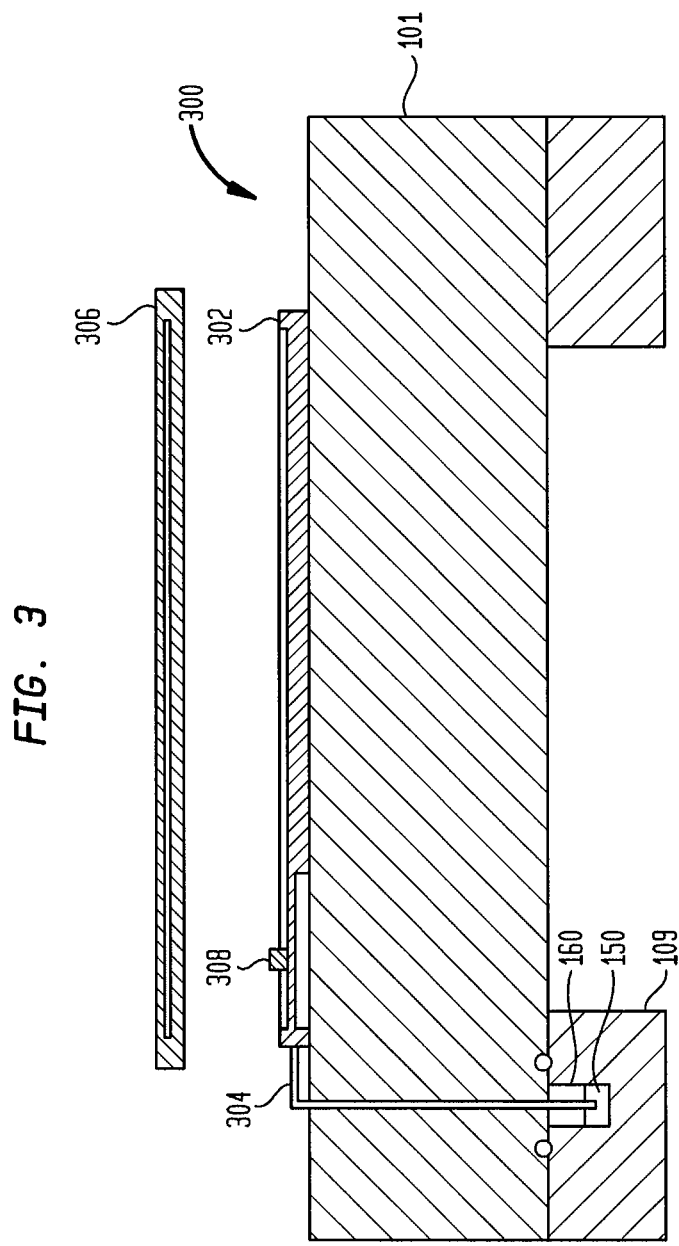
FIG. 3 illustrates a cross-sectional view of a carrier head having one or more sensor assemblies, according to one embodiment.

FIG. 3 illustrates a cross-sectional view of a carrier head 300 having one or more sensor assemblies 150, according to another embodiment. The carrier head 300 is substantially similar to carrier head 108. The carrier head 300 further includes a moving coil 302 positioned on a top surface of the carrier head 300 beneath a stationary coil 306. The moving coil 302 is electrically coupled to one or more sensor assemblies 150 via a dongle 304. The moving coil 302 includes a transmitter 308 and an antenna 310. The transmitter 308 is positioned in the moving coil 302. In one embodiment, the transmitter 308 is embedded in the moving coil 302. The antenna 310 is coupled to the transmitter 308. The antenna 310 extends partially through the moving coil 302, extending above the top surface of the moving coil 302. In some embodiments, the stationary coil 306 the moving coil 302 can be inductively coupled together by the delivery of an AC signal through the stationary coil 306 so that a voltage can be formed within the circuitry (e.g., dongle 304)

disposed within the carrier head 300 to drive the sensors 201 and/or charge the batteries 206. In some embodiments, the motion of the moving coil 302 as the carrier head 300 moves during CMP processing creates an inductive charge with the stationary coil 306 positioned above. As such, the one or more batteries 206 may be charged during CMP processing.

Figure 4:
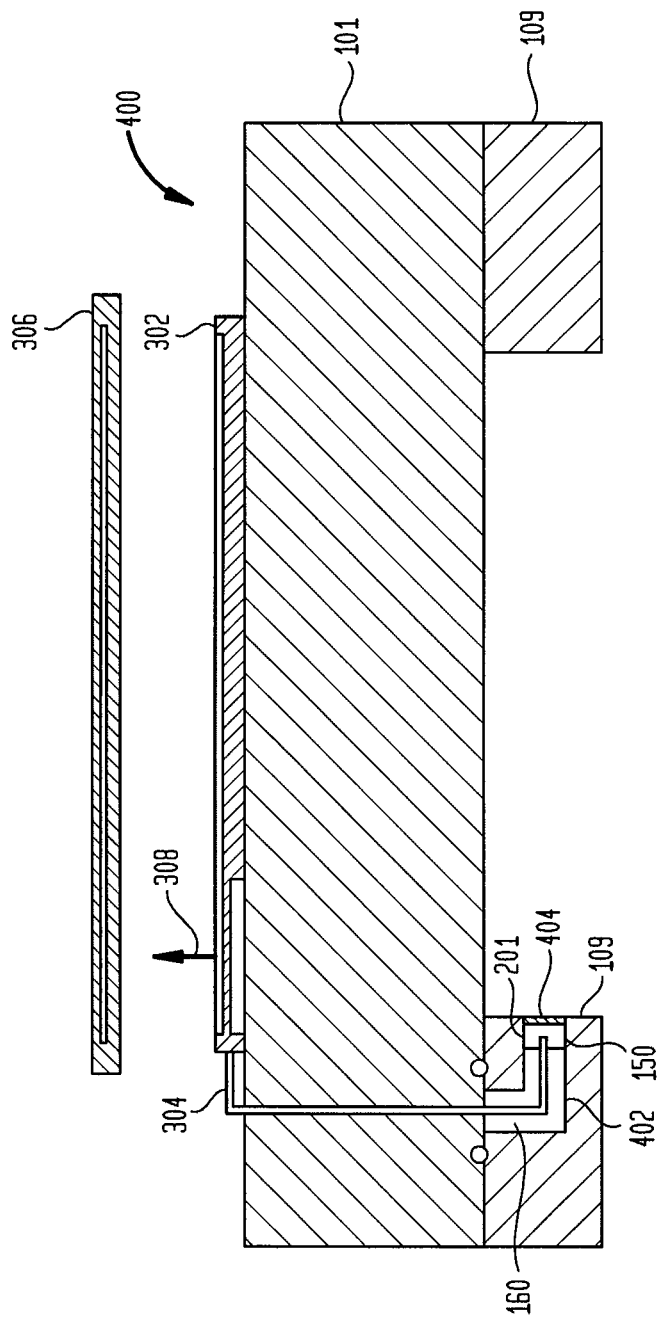
FIG. 4 illustrates a cross-sectional view of a carrier head having one or more sensor assemblies, according to one embodiment.

FIG. 4 illustrates a cross-sectional view of a carrier head 400 having one or more sensor assemblies 150, according to one embodiment. The carrier head 400 is substantially similar to carrier head 300. The carrier head 400 further includes a perpendicular opening 402 in communication with the channel 160 formed in the carrier head 400 and the retaining ring 109. In this embodiment, the sensor 201 is positioned within the perpendicular opening 402. The retaining ring 109 further includes a membrane 404 positioned between the sensor 201 and the opening formed in the retaining ring 109. The membrane 404 is configured to protect the sensor from slurry during CMP processing. In one embodiment, the membrane 404 may be formed from a silicon-based material. Positioning the sensor 201 behind the membrane 404 in the perpendicular opening 402, allows the sensor 201 (e.g., acoustic sensor) to detect sound waves as the sound waves pass through the slurry during CMP processing. For example, if a scratch occurs on the substrate due to drying out of the slurry, the controller 190 would be able to detect the scratch through the sensor 201 detection of sound waves though the slurry.

Figure 5:
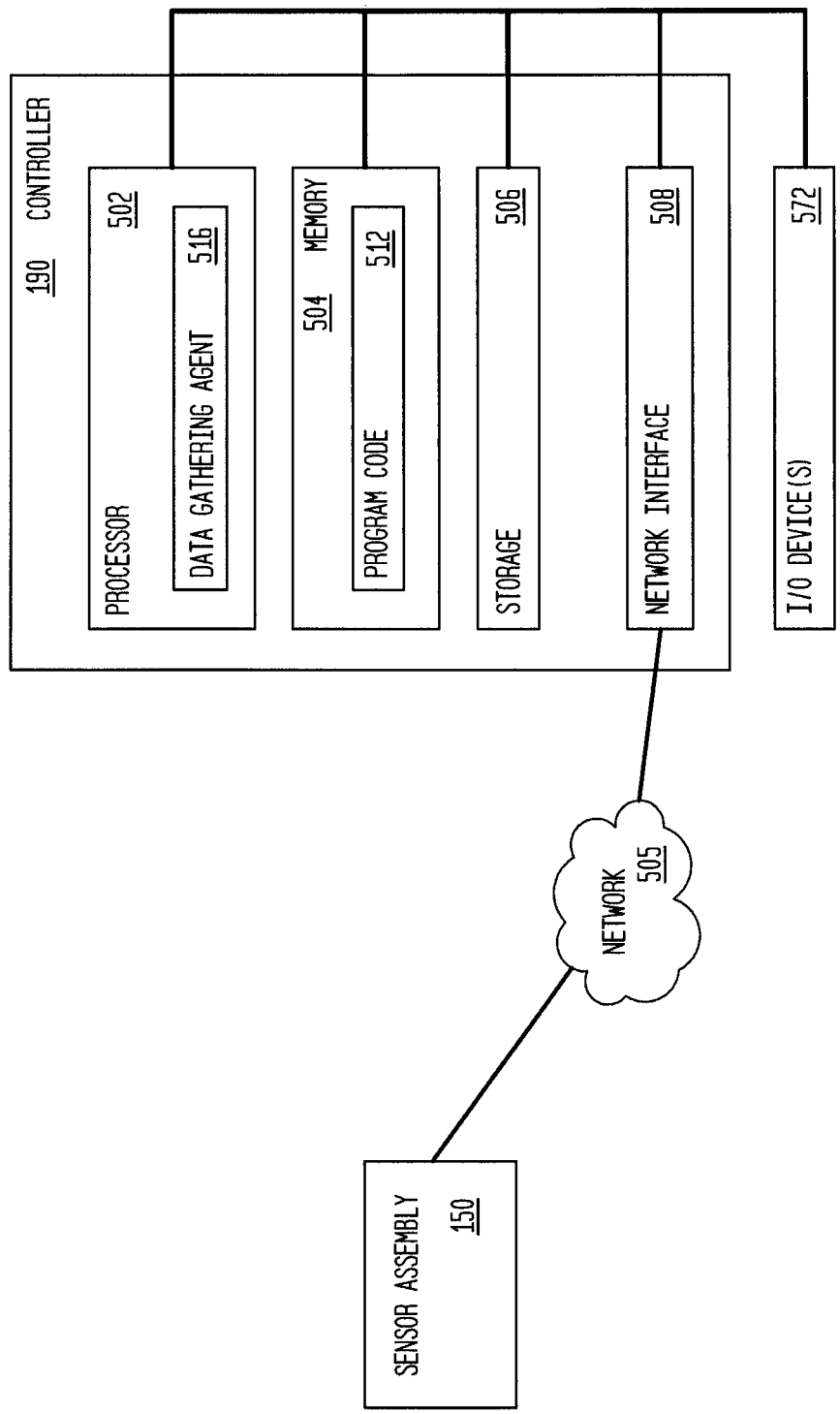
FIG. 5 illustrates a computing environment, according to one embodiment.

FIG. 5 is an example computing environment 500, according to one embodiment. The example computing environment 500 includes the sensor assembly 150 and the controller 190. The sensor assembly 150 communicates with the controller 190 over network 505. For example, CMP vibration signals detected by the sensor assembly 150 will be transmitted to the controller 190 using short range wireless methods, such as Bluetooth, radio-frequency identification (RFID) signaling and standards, near field communication (NFC), ZigBee, or other wireless communication methods.

Controller 190 includes a processor 502, a memory 504, storage 506, and network interface 508. The processor 502 retrieves and executes programming instructions, such as program code 512, stored in memory 504. For example, the program code 512 may be the method 600 discussed below, in conjunction with FIG. 6. The processor 502 is included to be representative of a single processor, multiple processors, a single processor having multiple processing cores, and the like. As shown, the processor 502 includes a data gathering agent 516. The data gathering agent 516 is configured to receive sensor data from sensor assembly 150. In some embodiments, data gathering agent 516 is configured to generate a data set for sensor assembly 150.

The storage 506 may be a disk drive storage. Although shown as a single unit, the storage 506 may be a combination of fixed and/or removable storage devices, such as fixed disk drives, removable memory cards, optical storage, network attached storage (NAS), or storage-area-network (SAN). The network interface 508 may be any type of network communications allowing the controller 190 to communicate with other computers via network 105, such as, for example, sensor assembly 150.

FIG. 6 is a flow diagram illustrating a method 600 for determining chemical mechanical polishing conditions, according to one embodiment. The method 600 begins at block 502. At block 502, a chemical mechanical polishing process may be performed on a substrate disposed in a chemical mechanical polishing apparatus. In some embodiments, the chemical mechanical polishing process may include a polishing process, a substrate loading or unloading process, a cleaning process, and the like.

The method 600 proceeds to block 604. At block 604, the sensor assembly 150 captures vibration emissions from the chemical mechanical polishing process performed. For example, vibrational emission information produced by the chemical mechanical polishing process is captured by the sensor 201 in sensor assembly 150.

At block 606, information associated with the vibration emissions captured by the sensor assembly 150 is transmitted by the sensor assembly 150 to controller 190. For example, the transmitter 202 transmits the information associated with the vibration emissions captured by the sensor assembly to the controller 190. In some embodiments, the information associated with the vibration emissions is wirelessly transmitted by the transmitter 202 to the controller 190. For example, information associated with the vibration emissions detected by the sensor assembly 150 will be transmitted to the controller 190 using short range wireless methods, such as Bluetooth, radio-frequency identification (RFID) signaling and standards, near field communication (NFC), ZigBee, or other wireless communication methods.

At block 608, one or more chemical mechanical polishing conditions are determined based on an analysis of the transmitted vibration emissions. For example, the vibration emissions can be sued for process control, such as end point detection, detection of abnormal conditions, such as substrate slippage, substrate loading and unloading issues, prediction of mechanical performance of the CMP head, and other associated mechanical assemblies that are an integral part of CMP polishing, and the like. Characteristic changes in a vibration frequency spectrum may reveal process end-points, abnormal conditions, and other diagnostic information. The captured vibration information may be analyzed to reveal malfunctions, such as, for example, substrate scratch detection caused by the polishing process, slurry arm and head collisions, head wear out (e.g., seals, gimbal, etc.), faulty bearings, conditioner head actuations, and the like.

At block 610, the chemical mechanical polishing apparatus may be controlled by the controller 190 based on the determined chemical mechanical polishing conditions.

While the foregoing is directed to embodiments of the present disclosure, further embodiments of the disclosure may be devised without departing from the basic scope thereof.

What is claimed is:

1. A carrier head for a chemical polishing apparatus, comprising:
   a body;
   a retaining ring coupled to the body; and
   a sensor assembly positioned at least partially in the body and partially positioned within the retaining ring, the sensor assembly comprising:
      a transmitter having a first end and a second end;
      an antenna coupled to the first end of the transmitter; and
      a vibrational sensor coupled to the second end, the vibrational sensor configured to detect vibrations during chemical mechanical processes with respect to radial, azimuthal, and angular axes of the carrier head.

2. The carrier head of claim 1, wherein the sensor assembly further comprises:
   one or more batteries configured to provide electrical power for the sensor assembly.

3. The carrier head of claim 2, where each of the one or more batteries has a lifetime substantially equal to a lifetime of the carrier head.

4. The carrier head of claim 1, further comprising:
a sensor cover substantially covering the vibrational sensor, the sensor cover coupled to the vibrational sensor via a ribbon connection.

5. The carrier head of claim 4, wherein the sensor cover extends partially above a top surface of the carrier head.

6. The carrier head of claim 1, wherein the transmitter is a short range wireless transmitter.

7. The carrier head of claim 6, wherein the transmitter is configured to transmit detected vibration emissions through one of Bluetooth, radio-frequency identification (RFID) signaling and standards, near field communication (NFC), ZigBee wireless communication methods.

8. The carrier head of claim 1, wherein the vibrational sensor is a micro electro-mechanical systems accelerometer.

9. The carrier head of claim 1, further comprising:
a moving coil positioned on a top surface of the carrier head; and
a stationary coil positioned over the moving coil, the moving coil and the stationary coil inductively coupled through a delivery of an alternating current signal through the stationary coil.

10. The carrier head of claim 9, wherein the carrier head further comprises:
a perpendicular opening in communication with a channel formed in the carrier head and the retaining ring, wherein the vibrational sensor is positioned in the perpendicular opening.

11. The carrier head of claim 10, wherein the carrier head further includes a membrane shielding the vibrational sensor from an opening in the retaining ring.

12. A chemical mechanical polishing system, comprising:
a carrier head, comprising:
a body;
a retaining ring coupled to the body;
a sensor assembly positioned at least partially in the body and partially positioned in the retaining ring, the sensor assembly comprising:
a transmitter having a first end and a second end;
an antenna coupled to the first end of the transmitter; and
a vibrational sensor coupled to the second end, the vibrational sensor configured to detect vibrations during chemical mechanical processes with respect to radial, azimuthal, and angular axes of the carrier head; and
a controller in communication with the sensor assembly.

13. The chemical mechanical polishing system of claim 12, wherein the carrier head further comprising:
a moving coil positioned on a top surface of the carrier head; and
a stationary coil positioned over the moving coil, the moving coil and the stationary coil inductively coupled through a delivery of an alternating current signal through the stationary coil.

14. The chemical mechanical polishing system of claim 13, wherein the carrier head further comprises:
a perpendicular opening in communication with a channel formed in the carrier head and the retaining ring, wherein the vibrational sensor is positioned in the perpendicular opening.

15. The chemical mechanical polishing system of claim 14, wherein the carrier head further includes a membrane shielding the vibrational sensor from an opening in the retaining ring.

16. The chemical mechanical polishing system of claim 12, wherein the carrier head further comprising:
a sensor cover substantially covering the vibrational sensor, the sensor cover coupled to the vibrational sensor via a ribbon connection.

17. The chemical mechanical polishing system of claim 16, wherein the sensor cover extends partially above a top surface of the carrier head.

18. A method for determining chemical mechanical polishing conditions, comprising:
performing a chemical mechanical polishing process on a substrate disposed in a chemical mechanical polishing apparatus;
capturing, via a sensor assembly disposed at least partially within in a body of a carrier head and partially with a retaining ring of the carrier head of the chemical mechanical polishing apparatus, vibration emissions from the chemical mechanical polishing apparatus;
transmitting information associated with the vibration emissions to a controller in wireless communication with the sensor assembly; and
determining a chemical mechanical polishing condition based on an analysis of the transmitted information.

\* \* \* \* \*